(12) United States Patent
Cooper et al.

(10) Patent No.: US 8,390,425 B1
(45) Date of Patent: Mar. 5, 2013

(54) RFID READER SYSTEMS WITH DOUBLE CONVERSION AND METHODS

(75) Inventors: Scott Anthony Cooper, Seattle, WA (US); Kurt Eugene Sundstrom, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 1522 days.

(21) Appl. No.: 11/742,650

(22) Filed: May 1, 2007

Related U.S. Application Data

(63) Continuation-in-part of application No. 11/622,092, filed on Jan. 11, 2007.

(60) Provisional application No. 60/832,666, filed on Jul. 21, 2006, provisional application No. 60/837,665, filed on Aug. 15, 2006.

(51) Int. Cl.
*G05B 23/02* (2006.01)
*H04Q 5/22* (2006.01)
*H04B 7/14* (2006.01)
*G06F 7/00* (2006.01)
*H03D 3/00* (2006.01)

(52) U.S. Cl. ...... 340/3.2; 340/3.6; 340/10.1; 340/12.51; 455/339; 455/18; 708/200; 708/208; 329/318; 329/319

(58) Field of Classification Search .............. 342/357.25
See application file for complete search history.

(56) References Cited

U.S. PATENT DOCUMENTS

| | | | |
|---|---|---|---|
| 6,476,708 B1 * | 11/2002 | Johnson | 340/10.34 |
| 6,512,478 B1 * | 1/2003 | Chien | 342/357.25 |
| 6,570,487 B1 * | 5/2003 | Steeves | 340/5.2 |
| 2002/0190846 A1 * | 12/2002 | Al-Araji et al. | 340/286.01 |
| 2005/0201450 A1 * | 9/2005 | Volpi et al. | 375/150 |
| 2005/0237160 A1 * | 10/2005 | Nolan et al. | 340/10.33 |

* cited by examiner

*Primary Examiner* — Jennifer Mehmood
*Assistant Examiner* — Pameshanand Mahase
(74) *Attorney, Agent, or Firm* — Truk IP Law, LLC

(57) ABSTRACT

RFID readers, reader systems, and methods are provided that utilize double conversion for received tag response signals. A digitized signal is derived from the tag response signal by first shifting the response signal to about DC. The components of the digitized signal are then up converted and down converted and filtered such that only components around DC remain. The up converted and down converted signals may then be compared and one selected or the two combined after weighting to enhance demodulation and reduce circuit complexity.

48 Claims, 14 Drawing Sheets

READER METHODS

FIG. 7 — DIRECT CONVERSION RECEIVER WITH INPUT AND OUTPUT SPECTRA

DECIMATION AND FILTERING IN DOUBLE DOWN CONVERSION

ADVANTAGE OF DOWNCONVERTING TO DC BEFORE APPLYING CIC DECIMATION FILTERS

RFID READER SYSTEMS WITH DOUBLE CONVERSION AND METHODS

RELATED APPLICATIONS

This utility patent application claims the benefit of U.S. Provisional Application Ser. No. 60/832,666 filed on Jul. 21, 2006, under 35 U.S.C. §119(e). The provisional application is incorporated hereby by reference.

This utility patent application claims the benefit of U.S. Provisional Application Ser. No. 60/837,665 filed on Aug. 15, 2006, under 35 U.S.C. §119(e). The provisional application is incorporated hereby by reference.

This utility patent application is a Continuation-In-Part (CIP) of U.S. application Ser. No. 11/622,092 filed on Jan. 11, 2007. The parent application is incorporated hereby by reference.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

A problem can occur if the RF wave received by the reader includes distortion due to interference. Interference can arise from a variety of intentional and unintentional transmission sources in the vicinity. Interfering RF signals may be generated, for example, from nearby wireless devices such as other RFID readers, and also cellular telephones, personal digital assistants, and the like.

Reader interference rejection may depend on several factors such as interferer type (e.g. CW or modulated), interferer frequency offset, and Signal-to-Interferer Ratio (SIR). When a reader circuit converts the received RF wave from the tag into a received signal, that signal is also distorted due to the interference. The distorted signal may cause false bits to be detected by the RFID reader, delay timing recovery, and so on. Typically complicated circuitry may have to be used for reliable demodulation on the reader side in the presence of interference, which increases cost and reduces efficiency of the reader.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments are directed to using double converted tag response signal for deriving data. By shifting the tag signal to about DC before digitizing and then performing a series of up conversion, down conversion, and filtering processes, the sampling rate can be reduced significantly allowing simpler circuit design with enhanced data decoding even in the presence of interference.

This and other features and advantages of the invention will be better understood in view of the Detailed Description and the Drawings, in which:

BRIEF DESCRIPTION OF THE DRAWINGS

Non-limiting and non-exhaustive embodiments are described with reference to the following drawings.

DETAILED DESCRIPTION

Figure 1:
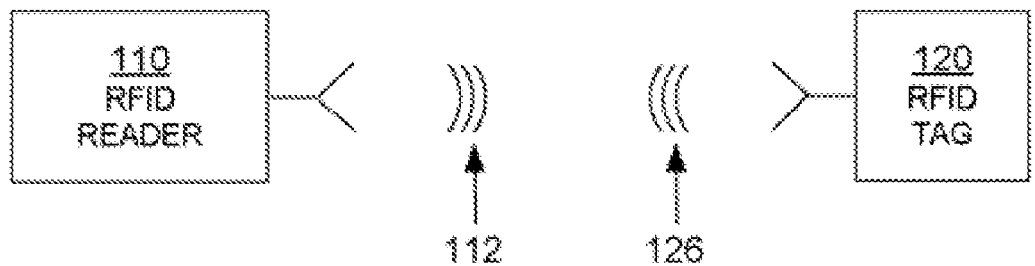
FIG. 1 is a diagram of an example RFID system including an RFID reader communicating with an RFID tag in its field of view.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed subject matter.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims.

All of the circuits described in this document may be implemented as circuits in the traditional sense, such as with integrated circuits etc. All or some of them can also be implemented equivalently by other ways known in the art, such as by using one or more processors, Digital Signal Processing (DSP), a Floating Point Gate Array (FPGA), etc.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active tag, i.e. having its own power source. Where tag 120 is a passive tag, it is powered from wave 112.

Figure 2:
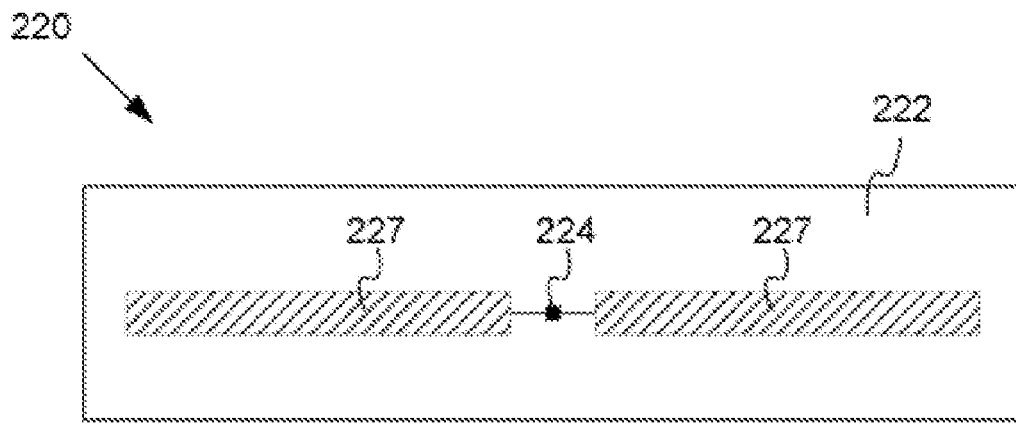
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different places of the segment can be coupled to one or more of the antenna ports of IC 224. For example, the antenna can form a single loop, with its ends coupled to the ports. When the single segment has more complex shapes, it should be remembered that at, the frequencies of RFID wireless communication, even a single segment could behave like multiple segments.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
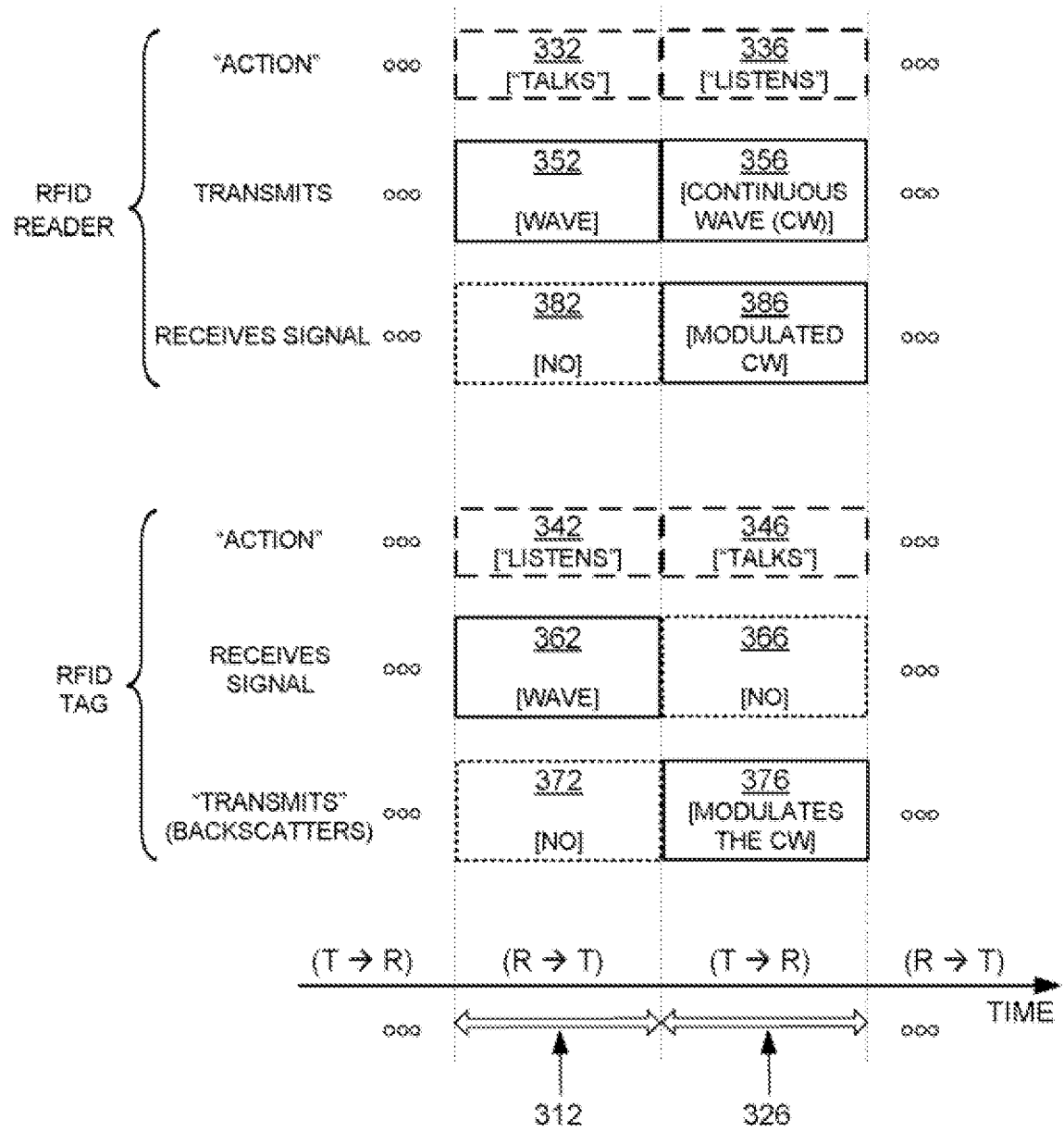
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface—EPC™ Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

The reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, Tag 120 can respond with a backscatter that is modulated onto a frequency, developed by Tag 120, that is different from the reader's emitted CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A number of jurisdictions require a reader to hop to a new channel on a regular basis. When a reader hops to a new channel it may encounter RF energy there that could interfere with communications.

Embodiments of the present disclosure can be useful in different RFID environments, for example, in the deployment of RFID readers in sparse- or dense-reader environments, in environments with networked and disconnected readers such as where a hand-held reader may enter the field of networked readers, in environments with mobile readers, or in environments with other interference sources. It will be understood that the present embodiments are not limited to operation in the above environments, but may provide improved operation in such environments.

Figure 4:
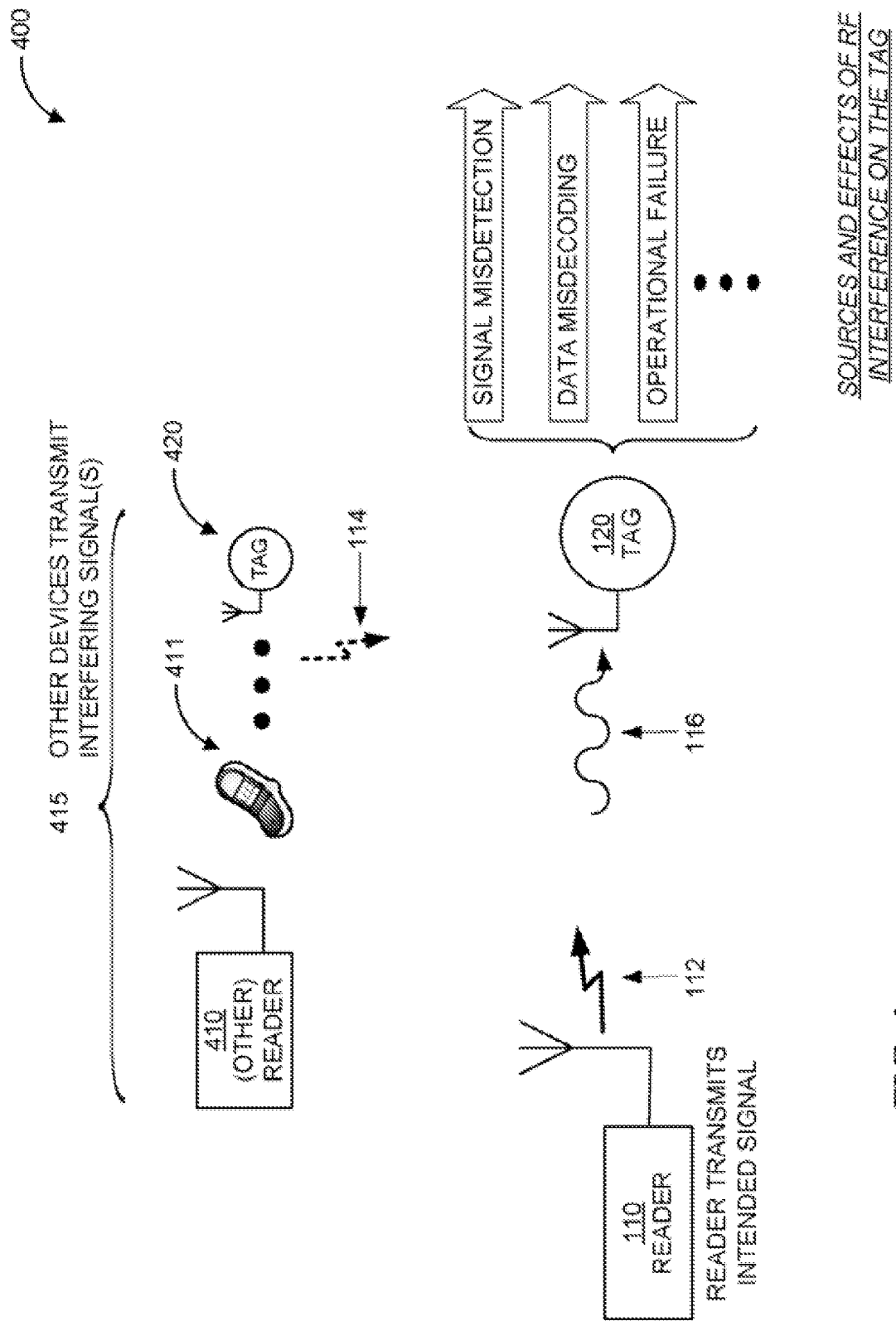
FIG. 4 is a conceptual diagram for explaining sources and effects of RF interference on the RFID tag for the system of FIG. 1.

FIG. 4 is a conceptual diagram for explaining sources and effects of RF interference on the RFID tag for the system of FIG. 1.

As shown in the figure, reader 110 transmits an intended signal in form of RF wave 112. Wave 112 travels through a medium, usually air, and in an ideal operation, wave 112 would arrive at tag 120 without any distortion from interference. Then it would be received and processed by tag 120.

In the real world, however, there are interference sources in the environment that wave 112 travels in. Wave 114 illustrated represents interfering signal(s) that can distort wave 112 as it travels. Wave 114 may be transmitted intentionally or unintentionally by a number of sources such as other reader 410, cellular phone 411, tag 420, and the like. These sources may be grouped as other devices 415 that transmit the interfering signal(s).

Accordingly, as wave 112 travels through the medium, it is affected by wave 114, and arrives at tag 120 as wave 116. Wave 116 may be modified in more than one way from wave 112. For example, its amplitude may be distorted, extra frequency components may be added, and even its phase may be distorted.

Since distorted wave 116 is received instead of wave 112 a number of undesirable effects may result for the tag. Such effects may include signal misdetection, data misdecoding, operational failure, and the like.

The opposite effect is true for the reader as well. Tag response signal may be distorted due to interference resulting in misreads or delay in timing recovery at the reader. To compensate for effects of interference and to efficiently demodulate tag response signals, RFID reader systems may employ complicated circuitry including higher order filters, which increase cost of device as well as operation (from a power consumption perspective).

The invention also includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Embodiments of an RFID reader system can be implemented as a combination of hardware and software. It is advantageous to consider such a system as subdivided into components or modules. A person skilled in the art will recognize that some of these components or modules can be implemented as hardware, some as software, some as firmware, and some as a combination.

Methods are now described more particularly according to embodiments.

Figure 5:
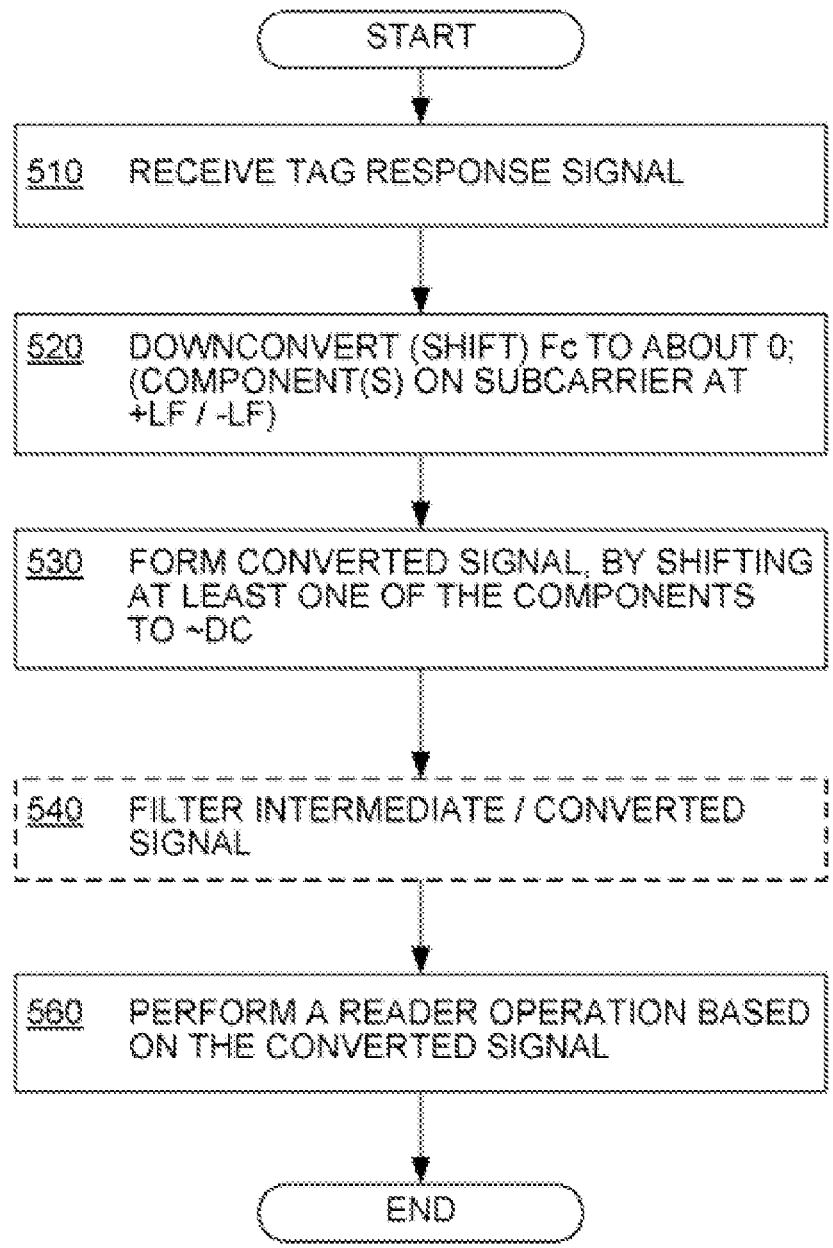
FIG. 5 is a flowchart of a double conversion process according to embodiments.

FIG. 5 is a flowchart of a double conversion process according to embodiments.

Process 500 begins at operation 510, where a wireless tag response signal is received by the reader. The tag response signal may be transmitted in response to a signal sent by the reader previously. The tag response signal may include a carrier frequency component Fc and subcarrier frequency components located at about identical distances from the carrier frequency.

According to next operation 520, the carrier frequency Fc of the tag response signal is downconverted to about 0 Hz with its subcarrier components being shifted to frequency values LF and −LF respectively.

According to next operation 530, a converted signal is formed by shifting at least one of the subcarrier components to about 0 Hz (DC).

According to next optional operation 540, the converted or intermediate signal is filtered to reduce components away from 0 Hz (DC).

According to next operation 550, a reader operation is performed based on the converted signal.

The operations included in process 500 are for illustration purposes. Double conversion in an RFID reader may be implemented by similar processes with fewer or additional steps, as well as in different order of operations using the principles described herein.

Figure 6:
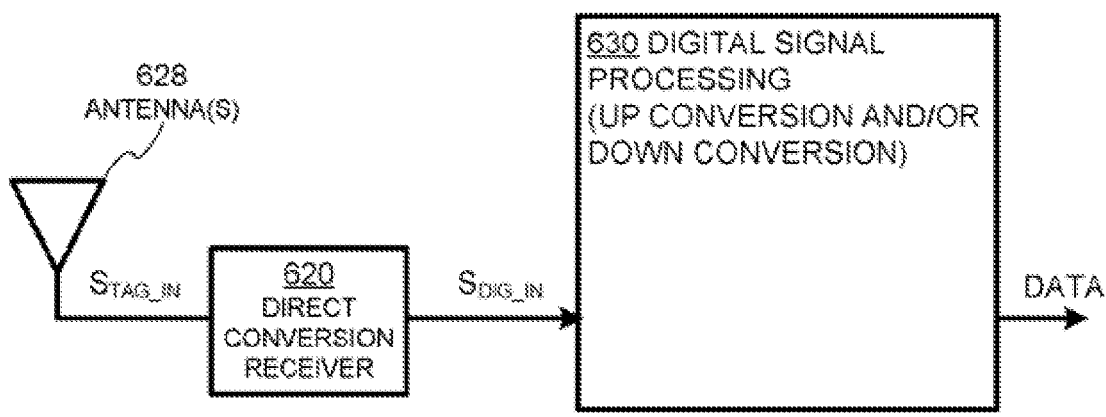
FIG. 6 is a block diagram of a double conversion architecture in an RFID reader system.

FIG. 6 is a block diagram of a double conversion architecture in an RFID reader system.

Architecture 600 shows antenna(s) 628 through which the incoming reader signal ($S_{TAG\_IN}$) is received and converted to digitized signal $S_{DIG\_IN}$ by direct conversion receiver 620. Direct conversion receiver 620 may be a direct down conversion receiver converting a spectrum of the received RF signal to DC. A baseband signal derived from the RF signal prior to digitization may be centered about 0 Hz (DC). The baseband signal may also be subjected to band pass filtering to reject interfering signals.

The baseband signal may then be digitized by the direct conversion receiver 620 before being provided to digital signal processing block 630. Digital signal processing block 630 may further process the digitized signal $S_{DIG\_IN}$ providing data to other tag circuits. According to some embodiments, digital signal processing block 630 may perform up conversion, down conversion, or both on $S_{DIG\_IN}$ before deriving data from the received signal.

Figure 7:
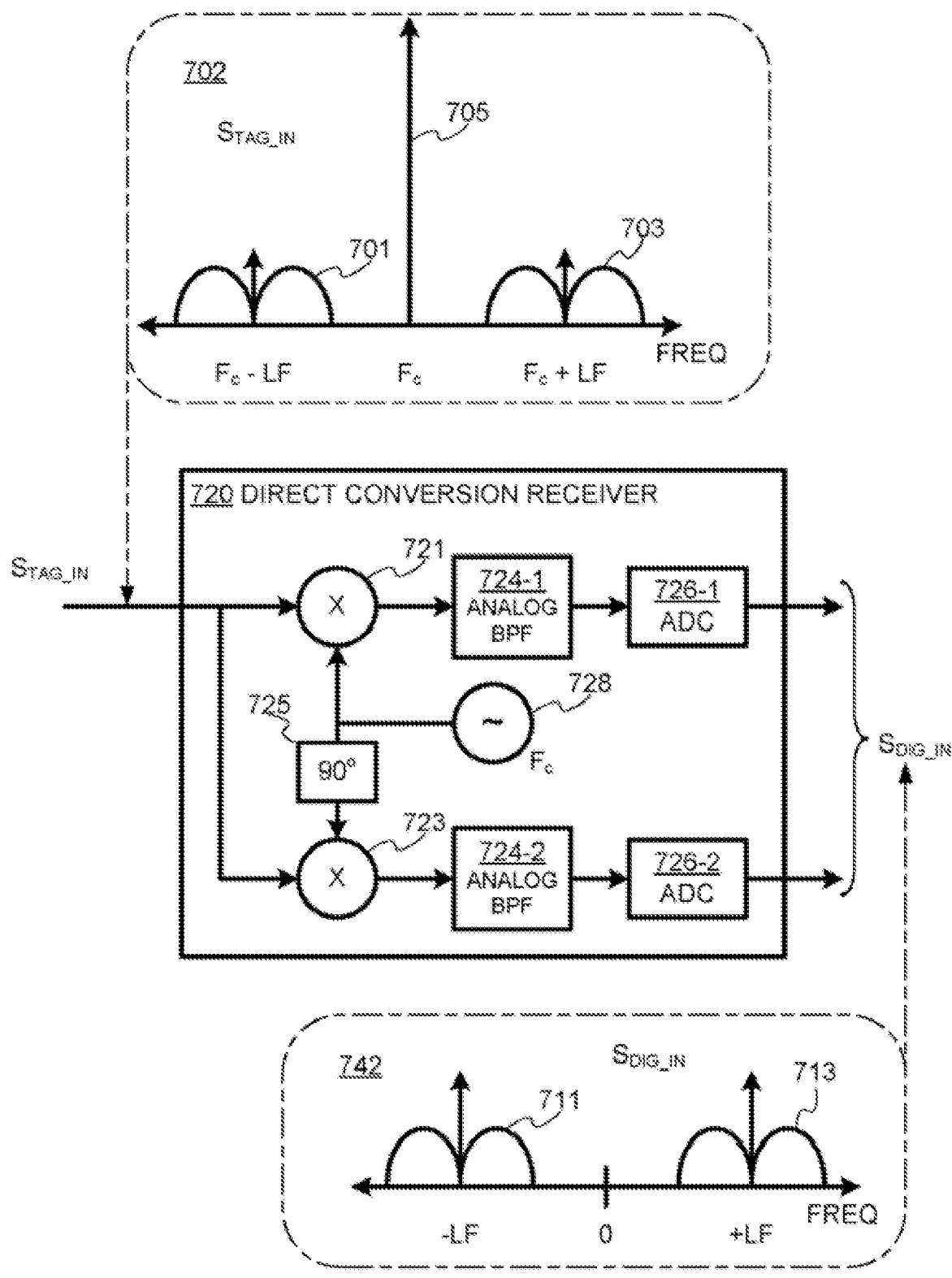
FIG. 7 is a block diagram of a direct conversion receiver according to embodiments, which may be used as the first conversion block in the architecture of FIG. 6.

FIG. 7 is a block diagram of a direct conversion receiver according to embodiments, which may be used as the first conversion block in the architecture of FIG. 6.

Received reader signal $S_{TAG\_IN}$ includes a carrier frequency component Fc (705) and two side lobes at frequencies Fc−LF and Fc+LF (701 and 703, respectively) as shown in input spectrum diagram 702. LF is sub-carrier frequency also known as Link Frequency. In RFID systems using Miller modulated sub-carrier, a data rate of the signal is defined as LF/M, where M is 2, 4, or 8.

After being down converted by direct conversion receiver 720, the spectrum 742 of output signal $S_{DIG\_IN}$ includes no carrier frequency component (filtered out) and side lobe components 711 at −LF and 713 at +LF, respectively. The mixing process in direct conversion receiver 720 eliminates the carrier frequency and the side lobe components are now centered about 0 Hz (DC). It should be noted, that due to component tolerances and environmental conditions, the output signal may not be centered exactly around DC, but shift within a relatively small tolerance up or down.

Direct conversion receiver 720 may include a pair of mixers 721 and 723 for down converting the received signal using Fc from generator 728 and a 90 degree shifted version of Fc (by phase shifter 725). These two signal components are sometimes referred to as I and Q components. The down converted signals are then passed through analog band pass filters 724-1 and 724-2 for rejecting interference components and subsequently digitized through Analog-Digital-Converters (ADCs) 726-1 and 726-2 providing $S_{DIG\_IN}$.

Figure 8:
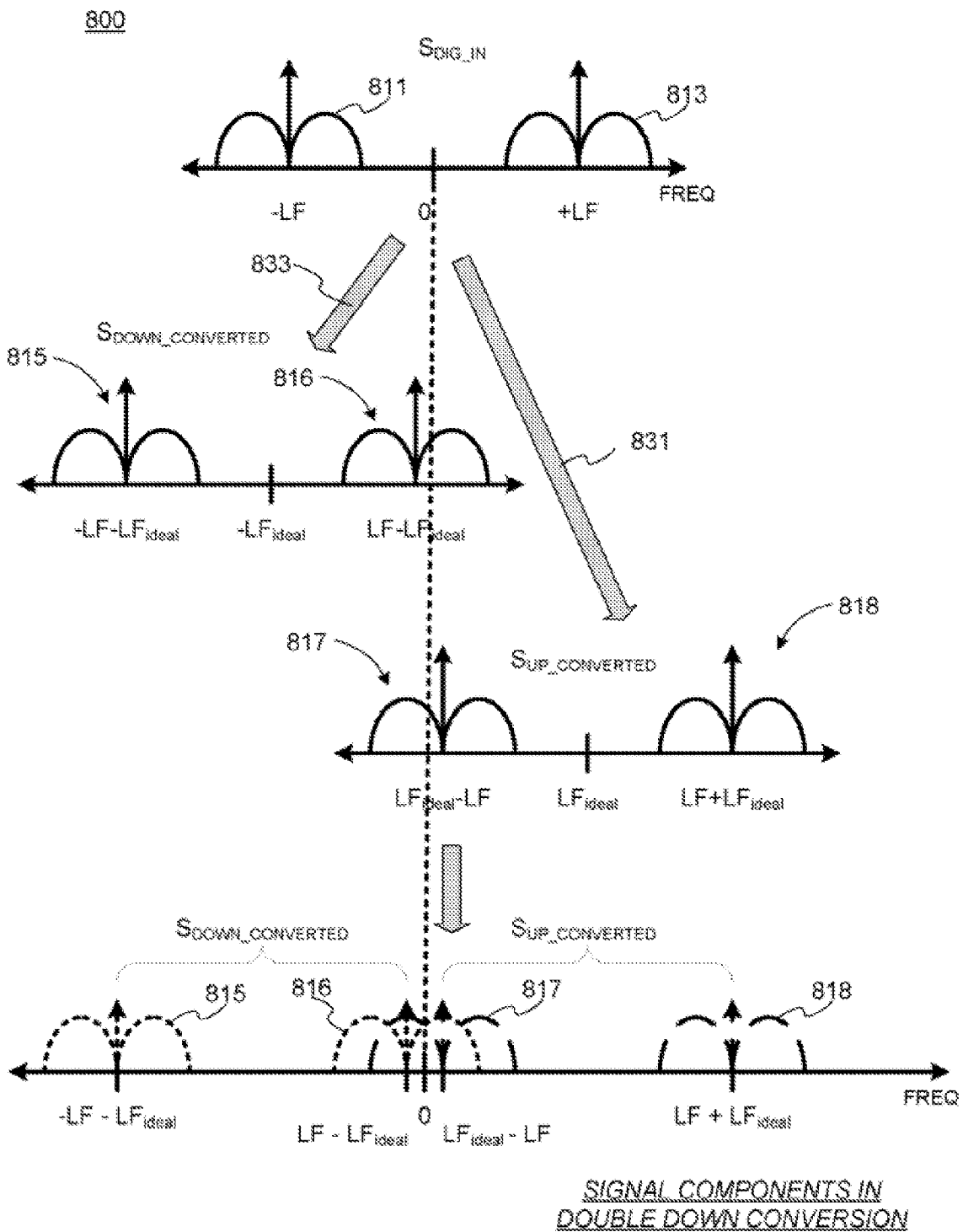
FIG. 8 illustrates frequency spectra of signal components resulting from the process of FIG. 5.

FIG. 8 illustrates frequency spectra 800 of signal components resulting from the process of FIG. 5. As described above, digitized signal $S_{DIG\_IN}$ includes two components 811 and 813 each centered about link frequency LF and negative link frequency −LF.

As a result of the down conversion process (indicated by reference numeral 833), a down converted signal $S_{DOWN\_CONVERTED}$ is obtained with components 815 and 816 centered about −LF-$LF_{ideal}$ and LF-$LF_{ideal}$, respectively. Thus, $S_{DOWN\_CONVERTED}$ itself is centered about −$LF_{ideal}$.

As a result of the up conversion process (indicated by reference numeral 831), an up converted signal $S_{UP\_CONVERTED}$ is obtained with components 817 and 818 centered about $LF_{ideal}$-LF and $LF_{ideal}$+LF respectively. Thus, $S_{UP\_CONVERTED}$ itself is centered about $LF_{ideal}$.

At the bottom diagram of FIG. 8, both up converted and down converted signals are shown on the same frequency diagram with their respective components in relation to DC. As can be seen, both signals have a component that is close to DC, while each signal also has a component that is away from DC (by about LF+$LF_{ideal}$), which may be filtered out in a subsequent process as discussed below.

In a typical implementation, the RF carrier frequency for the reader signal may be around 900 MHz with the link frequency being about 256 kHz in dense reader operation mode. These are, of course, example values, but embodiments of the invention are not limited to these specific frequencies. A double conversion reader system may be implemented to operate at any RF and/or LF frequency.

Figure 9:
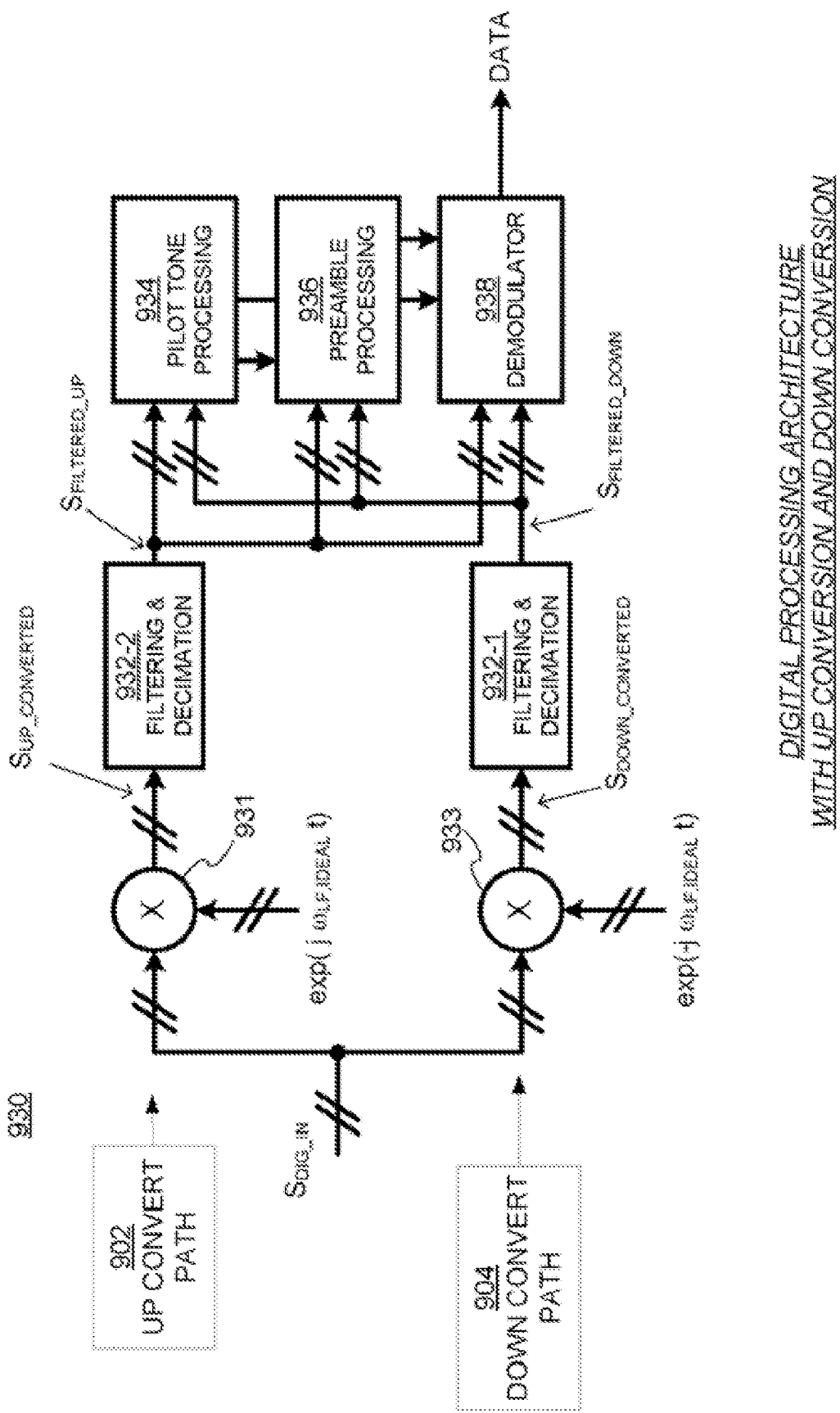
FIG. 9 is a block diagram illustrating major functional blocks of a digital signal processing according to embodiments, which performs both up-conversion and down-conversion, and may be used as the second conversion block in the architecture of FIG. 6.

FIG. 9 is a block diagram illustrating major functional blocks of a digital signal processing according to embodiments, which performs both up-conversion and down-conversion, and may be used as the second conversion block in the architecture of FIG. 6.

A digital signal processing block according to embodiments includes two pathways: up conversion path 902 and down conversion path 904. Digitized signal $S_{DIG\_IN}$ is digitally mixed at mixer 931 using exp(jωt), where ω is based on $LF_{ideal}$ rendering $S_{UP\_CONVERTED}$. Similarly, $S_{DIG\_IN}$ is digitally mixed at mixer 933 using exp(−jωt), where ω is based on $LF_{ideal}$ rendering $S_{DOWN\_CONVERTED}$.

The signals are then processed by filtering and decimation blocks 932-2 and 932-1 on each pathway, respectively, resulting in $S_{FILTERED\_UP}$ and $S_{FILTERED\_DOWN}$. Filtering and decimation (e.g. by CIC decimation filters) reduces the sample rate. Digital mixing allows selection of arbitrary LFs and enables the circuit not to be constrained by the ADC data rate or a digital clock rate. The digital mixers 931 and 933 translate the received signal such that the upper side band is mixed down to near DC and the lower side band is mixed up to near DC. A residual frequency error may result due to tag backscatter frequency uncertainty.

The filtered signals $S_{FILTERED\_UP}$ and $S_{FILTERED\_DOWN}$ may then be provided to demodulator 938 for deriving data from the signal. Optionally, a pilot tone processing block 934 and a preamble processing block 936 may also be employed to perform detection and estimation for signal frequency and time of arrival.

Figure 10A:
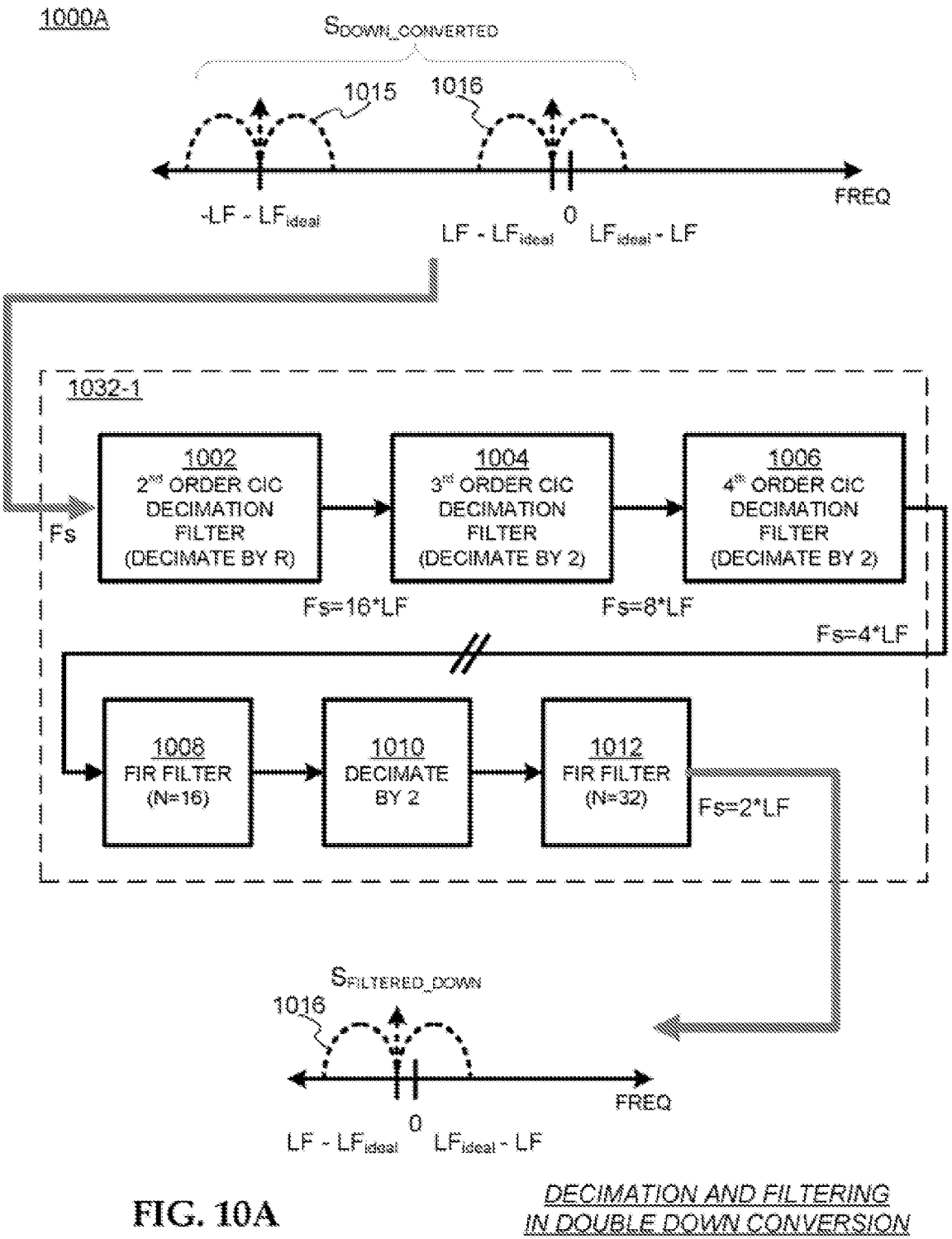
FIG. 10A illustrates an example block diagram of a filtering and decimation circuit of the digital signal processing block of FIG. 9, along with input and output signal spectra of the down converted and filtered signals according to embodiments.

FIG. 10A illustrates an example block diagram of a filtering and decimation circuit of the digital signal processing block of FIG. 9, along with input and output signal spectra of the down converted and filtered signals according to embodiments.

Down converted signal $S_{DOWN\_CONVERTED}$ has two components, as discussed before, component 1015 at about −LF-$LF_{ideal}$ and component 1016 at about DC. Due to tag response frequency uncertainties, component 1016 is not exactly at DC.

A filtering and decimation block 1032-1 according to embodiments is used to filter component 1015 such that component 1016 ($S_{FILTERED\_DOWN}$) is left, which has a bandwidth between frequencies LF-$LF_{ideal}$ and $LF_{ideal}$-LF.

Filtering and decimation block 1032-1 includes series of Cascaded Integrator-Comb (CIC) filters each filter stage dropping the sample frequency by half. In an example embodiment, a second order CIC decimation filter (1002) may be used to drop sampling frequency Fs to 16 times LF, then a third order CIC decimation filter (1004) to 8 times LF, and then a fourth order CIC decimation filter (1006) to 4 times LF.

The series of CIC filters may be followed by serially coupled FIR filters and a decimation circuit. For example, FIR filter 1008 followed by decimator 1010 (which is configured to decimate by 2), which in turn is followed by FIR filter 1012, may further reduce the sampling rate to 2 times LF resulting in significant reduction of necessary bandwidth and enhancement of demodulator performance.

A number of stages, an order of each stage, and a total amount of decimation may vary depending on design parameters. Embodiments are not limited to the above described example implementation.

By frequency translating both side bands to DC, more benefit is gained from the CIC filters. For example, lower order CIC filters may be used because signal pass band is near DC and would be limited only by filter stop band. Higher order CIC filtering may also be used because the signal pass band is near DC and would be limited only by the filter roll-off.

The FIR filters are enabled by the low sample rate. Reduced number of taps and reduced sample rate is advantageous for simpler circuit design. First FIR stage (1008) provides anti-aliasing filtering. Second FIR stage 1012 provides channel filtering.

A number of stages and an order of each stage in the FIR filter blocks may also vary depending on design parameters. Embodiments are not limited to the above described example implementation.

Figure 10B:
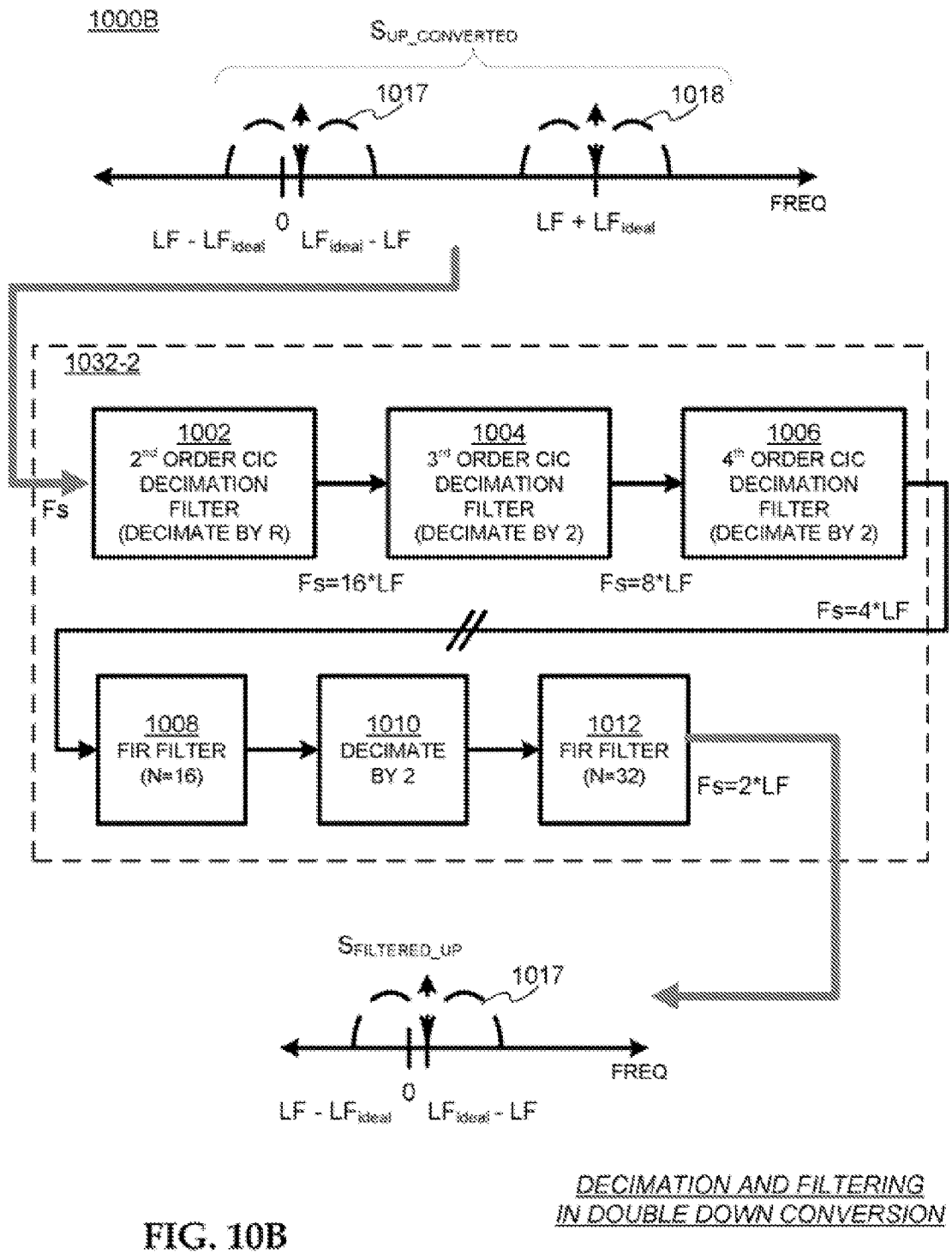
FIG. 10B illustrates an example block diagram of a filtering and decimation circuit of the digital signal processing block of FIG. 9, along with input and output signal spectra of the up converted and filtered signals according to embodiments.

FIG. 10B illustrates an example block diagram of a filtering and decimation circuit of the digital signal processing block of FIG. 9, along with input and output signal spectra of the up converted and filtered signals according to embodiments.

Filtering and decimation block 1032-2 in FIG. 10B includes same components as filtering and decimation block 1032-1 of FIG. 10A since the up conversion and down conversion pathways are identical. Up converted signal $S_{UP\_CONVERTED}$ with it components 1017 and 1018 are processed by the series of CIC filters reducing input signal sampling rate to 4 times LF, where the first stage decimation is programmable for adjusting desired sample rate to LF.

Following filtering and decimation by the CIC filters and the FIR filters, output signal $S_{FILTERED\_UP}$ is derived with component 1017 between frequencies LF-$LF_{ideal}$ and $LF_{ideal}$-LF.

As mentioned above, a number of stages, an order of each stage, and a total amount of decimation in the CIC decimation filter block and the FIR filter block may vary depending on design parameters. Embodiments are not limited to the above described example implementations.

Figure 11:
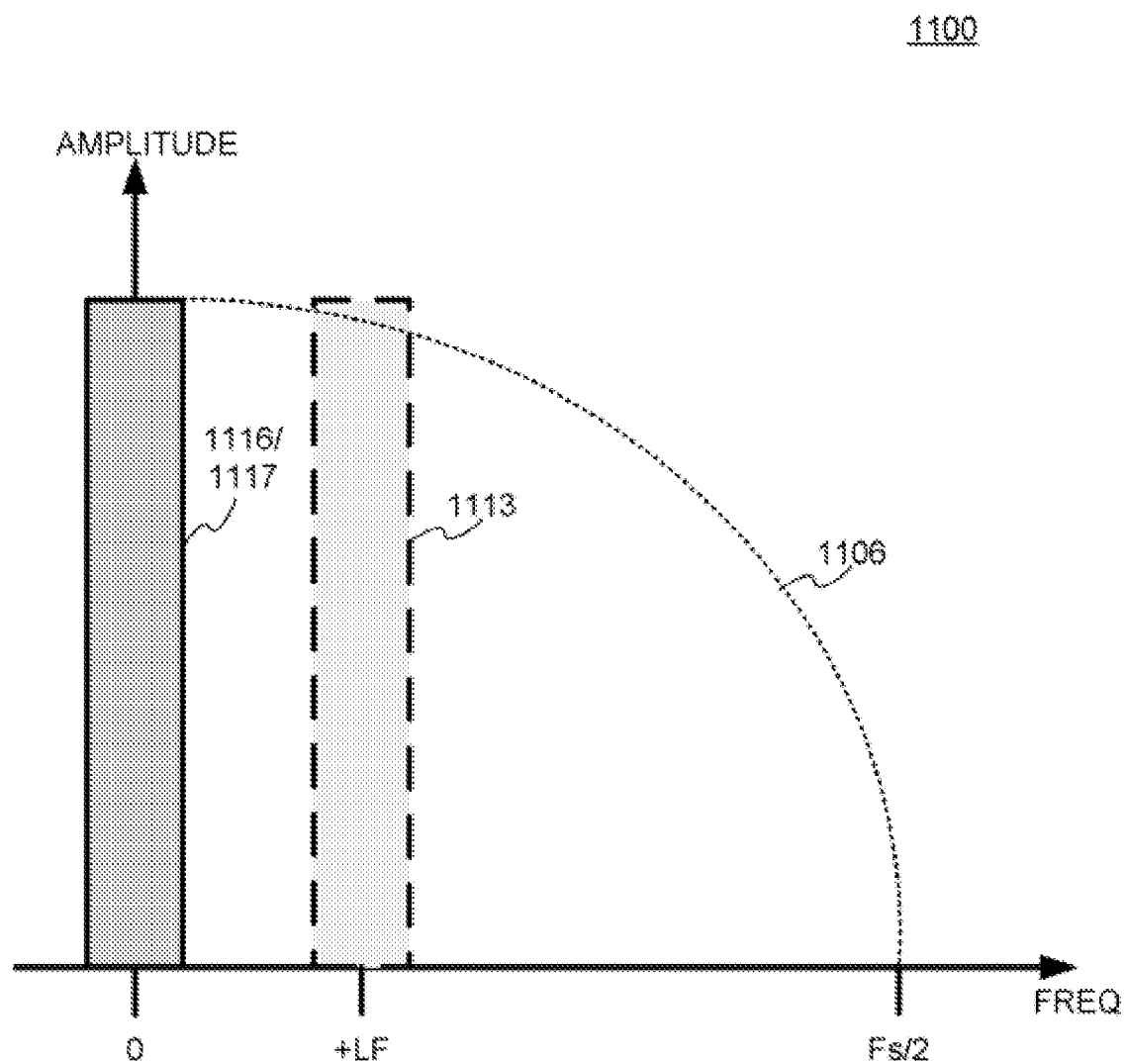
FIG. 11 illustrates the advantage of down converting or up converting a subcarrier component to near DC before applying Cascaded Integrator-Comb (CIC) decimation filters according to embodiments.

FIG. 11 illustrates the advantage of down converting or up converting a subcarrier component to near DC before applying Cascaded Integrator-Comb (CIC) decimation filters according to embodiments.

Diagram 1100 shows a filter response 1106 with the filter rolling off to stop frequency at Fs/2. Signal components converted down to near DC (1116, 1117) is near the peak of the pass band, while component 1113—which is filtered out by the process—would be in the roll off region of the filter. Thus, before applying the CIC decimation filters, utilizing the converted signal near DC is advantageous.

Figure 12:
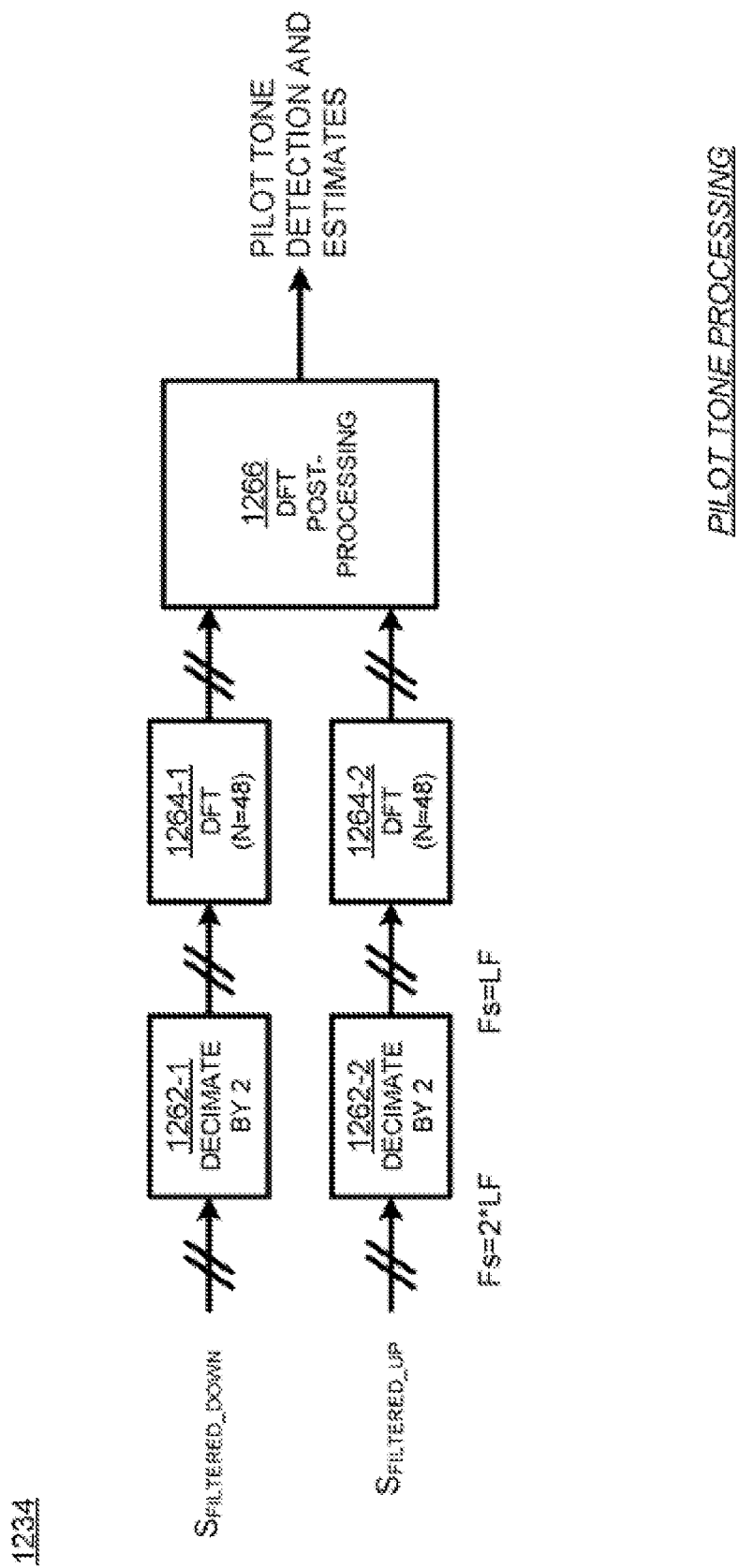
FIG. 12 is a block diagram of an example pilot tone processing circuit for double down conversion of pilot tone in an RFID reader according to embodiments.

FIG. 12 is a block diagram of an example pilot tone processing circuit for double down conversion of pilot tone in an RFID reader according to embodiments.

When pilot tone is enabled in reader tag communications, each packet is preceded by the pilot tone at the sub-carrier frequency (LF). The detected pilot tone is used to estimate tag signal frequency and perform timing recovery.

Pilot tone processing block 1234 includes two identical paths for $S_{FILTERED\_UP}$ and $S_{FILTERED\_DOWN}$. The pilot tone, according to commonly used standards, consists of 64 cycles of LF and only 48-point Digital Fourier Transform (DFT) is used to allow for transition times. The filtered signal is first decimated by 2 such that sampling frequency Fs is LF by decimators 1262-1 and 1262-2. Then, the DFT circuits 1264-1 and 1264-2 perform DFT detecting and estimating the pilot tone (and its timing). Since the signal is decimated down to LF, the DFT circuits only need to calculate frequency bins centered around DC.

Following the DFT on the decimated signals, DFT post-processing circuit 1266 provides pilot tone detection and estimates to timing recovery and other circuits. Due to the reduced sample rate, DFT length and complexity are significantly reduced.

A number of stages and an order of each stage in the DFT block may vary depending on design parameters. Embodiments are not limited to the above described example implementation.

Figure 13A:
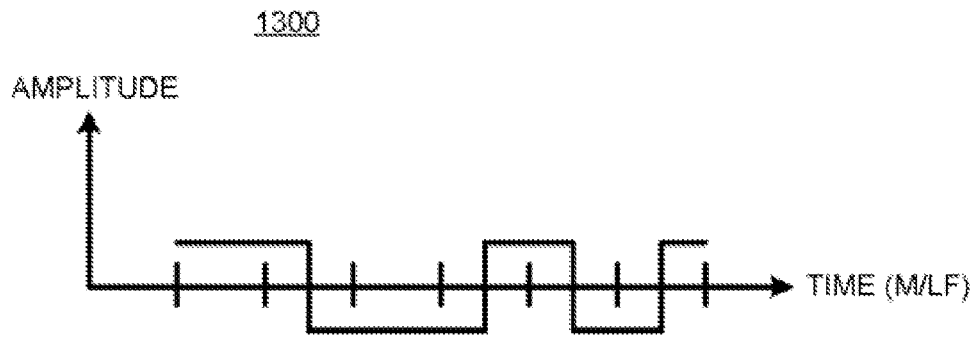
FIG. 13A illustrates an example Miller baseband preamble.

FIG. 13A illustrates a diagram 1300 of an example Miller baseband preamble.

Figure 13B:
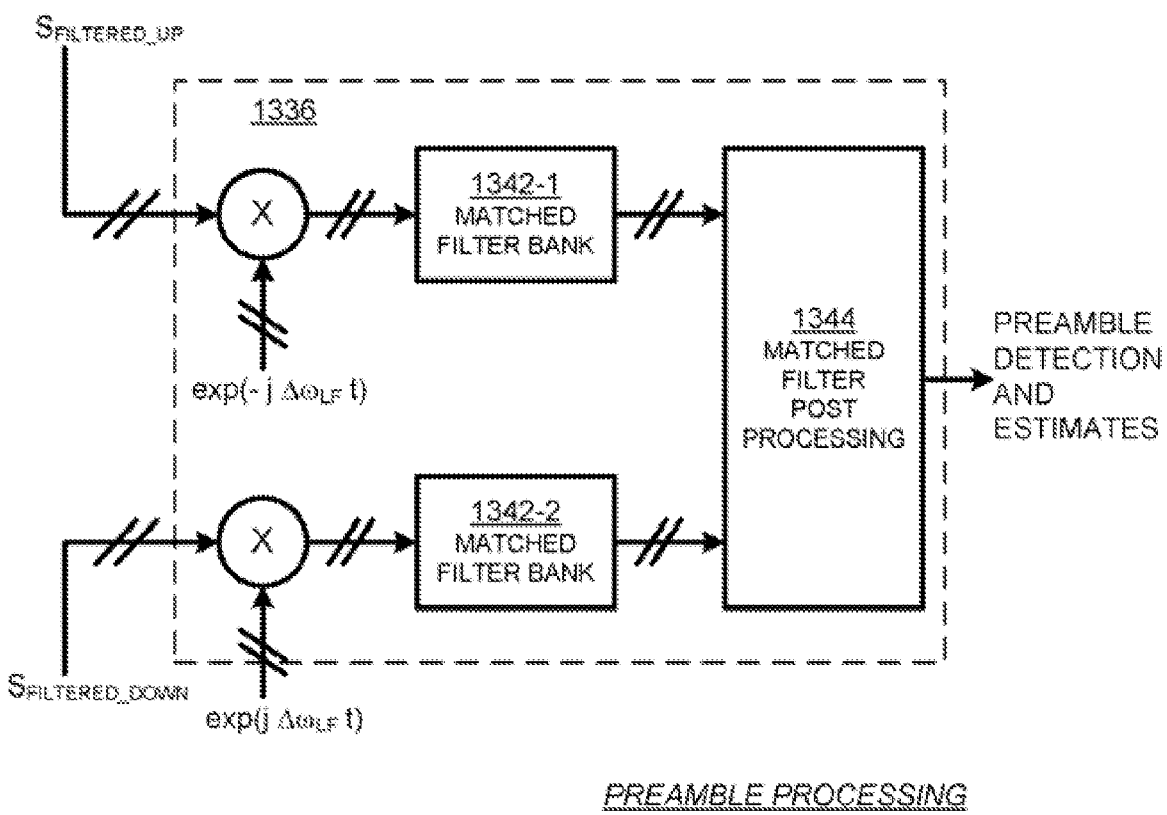
FIG. 13B shows an example preamble processing circuit for an RFID reader implementing matched filters according to embodiments.

FIG. 13B shows an example preamble processing circuit for an RFID reader implementing matched filters according to embodiments.

Detected preamble may be used to determine which of the signals is to be selected for demodulation or if one is to be deweighted, which one is to be deweighted. Asynchronous matched filtering provides a means to estimate the time of arrival of the preamble. Time of arrival estimate, in return, improves timing recovery loop performance and enables simpler circuit design. Again, by frequency translating the signal to DC, the matched filters operate on baseband symbols at a suitable frequency such as 2 times LF.

As shown in FIG. 13B, preamble processing block 1336 receives filtered signals $S_{FILTERED\_UP}$ and $S_{FILTERED\_DOWN}$ and mixes then through a second set of mixers with −LF and LF, respectively. The mixed signals are then provided to the matched filter banks 1342-1 and 1342-2, which operate at a suitable frequency such as 2 times LF. After post-processing at matched filter post processing circuit 1344, preamble detection and estimates are provided to timing recovery and other circuits for decisions based on the detected preamble.

The matched filters may also be adjusted based on a residual frequency error as a result of the pilot tone detection.

According to one embodiment, a method for an RFID reader system includes receiving a tag response signal that is centered at a first frequency and has a first and a second component at two respective subcarriers of the first frequency, generating an intermediate signal by shifting the tag response signal such that the intermediate signal has the first component at a second frequency value and the second component at about a negative of the second frequency value, generating a converted signal by shifting the intermediate signal such that the first component is shifted to a third frequency that has a value of about 0 Hz, and performing a reader operation in response to the converted signal.

The method may further include filtering the second component from one of the intermediate signal and the converted signal prior to performing the reader operation. The first component may be shifted down or up to the third frequency. The third frequency is intended to be exactly 0 Hz.

According to another embodiment, the method may also include detecting a pilot tone included in the tag response signal, determining a residual frequency error from the detected pilot tone, and employing the determined residual frequency error to initialize at least one demodulator. The method may also include shifting the intermediate signal such that the second component is shifted to a fourth frequency that has a value of about 0 Hz and filtering the first component from one of the intermediate signal and the converted signal prior to performing the reader operation. The second component may be shifted down or up to the third frequency.

According to a further embodiment, the method may include comparing the shifted first component and the shifted second component, and selecting one of the shifted first and second components to generate the converted signal. The one of the shifted first and second components may be selected on the basis of their respective Signal-to-Noise Ratio (SNR). The converted signal may be generated from a non-zero portion of the first component at the third frequency and a non-zero portion of the second component at the fourth frequency by weighting each of the non-zero portions with a weighting factor between 0 and 1, and adding the weighted portions of the first and second components.

The method may further include determining a Signal-to-Noise Ratio (SNR) of the portion of the first component and the portion of the second component, and deweighting the component with a smaller SNR value compared to the other component. Furthermore, a power level of the portion of the first component and the portion of the second component may be determined, and the component with a larger power level deweighted compared to the other component. Each of the first component, the second component, and a sum of the first and second components may be processed by three distinct demodulators. Alternatively, each of the first component, the second component, and a sum of the first and second components may be processed by a single demodulator in a time-shifted manner before the selection is made.

The weighting may be based on detecting a preamble of the tag response signal from each of the first component, the second component, and a sum of the first and second components, and the method may further include filtering the intermediate signal by processing the intermediate signal by a series of decimation and finite impulse response filters such that a sample rate of the filtered intermediate signal is about two times the second frequency value. The decimation filters may include Cascade Integrator-Comb (CIC) filters.

According to yet another embodiment, the second frequency value is about a desired second frequency value, and the desired second frequency value is adjustable by the reader. The desired second frequency value may be adjusted in response to a feedback based on an attribute of data derived from the converted signal, it may be commanded by the reader to a responding tag, or it may be determined by the reader from the tag response signal. According to some embodiments, the second frequency value may be about 256 kHz.

According to yet further embodiments, the method may include mixing the intermediate signal twice using a secondary frequency source such that the converted signal is centered substantially about 0 Hz, and employing a feedback loop in processing the intermediate signal such that the converted signal is centered substantially about 0 Hz. A bank of matched filters may also be employed to filter the converted signal.

The method may further include detecting a pilot tone included in the tag response signal, determining a residual frequency error from the detected pilot tone, and adjusting the matched filter banks based on the residual frequency error. The tag response signal may be in Miller Mode.

Another set of methods are described below relating to the operation of an RFID reader or RFID reader system according to embodiments.

Figure 14:
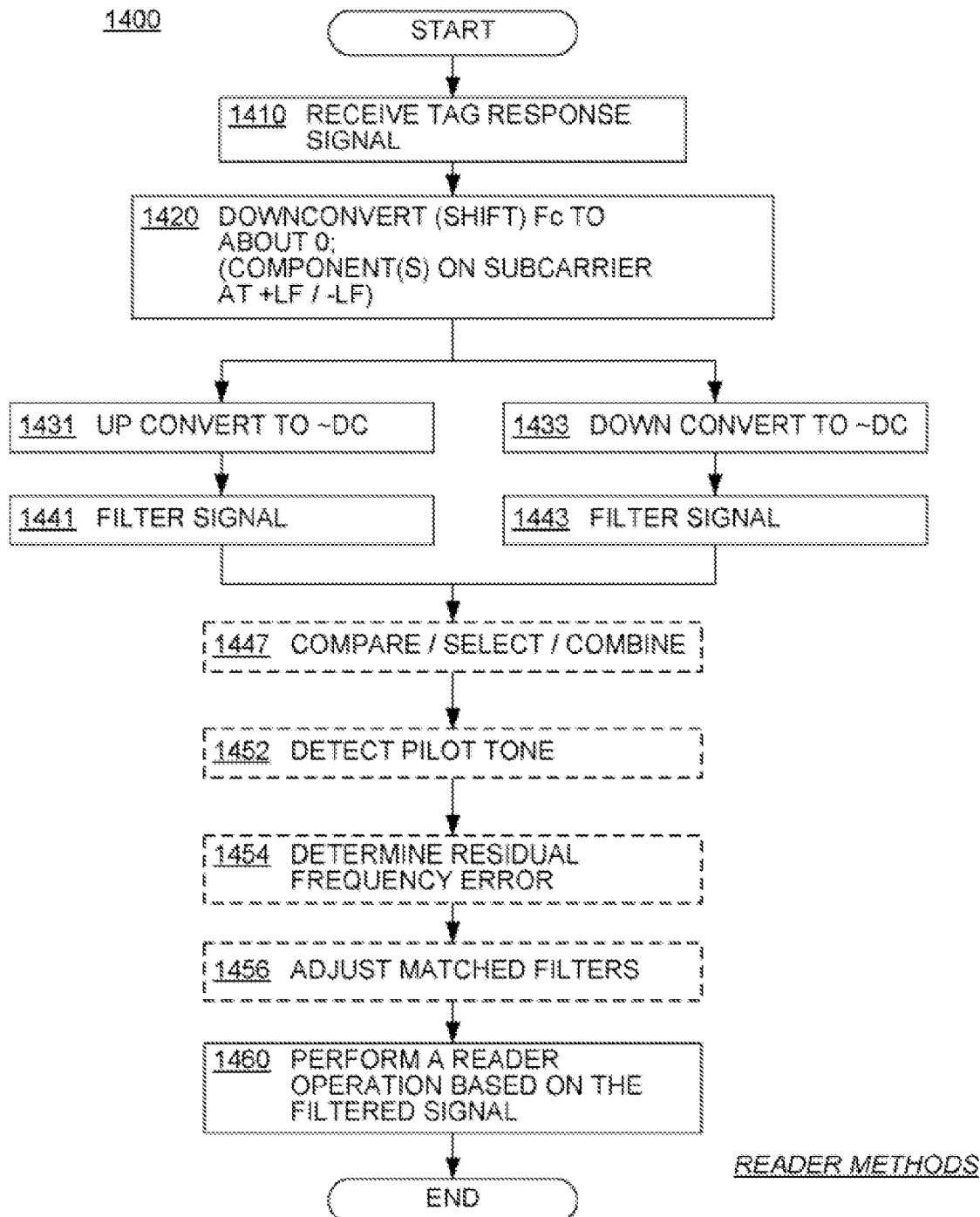
FIG. 14 is a flowchart of a double conversion process implementing matched filters and pilot tone detection according to one embodiment.

FIG. 14 is a flowchart of a double conversion process 1400 implementing matched filters and pilot tone detection according to one embodiment.

Process 1400 begins at operation 1410, where the tag response signal is received with a carrier frequency of Fc.

According to a next operation 1420, the carrier frequency Fc is shifted (or down converted) to about 0 Hz (DC) with the side lobe components of the signal being shifted to LF and −LF.

Two operations follow operation 1420. According to a next operation 1431, the component at −LF is up converted to about DC, and according to operation 1433, the component at LF is down converted to about DC.

Following both operations 1431 and 1433, each signal is filtered in parallel operations 1441 and 1443.

According to a next optional operation 1447, the components are compared, selected, and or combined. Based on a signal to noise ratio, a preamble detection, or an amplitude of each component, one of the components may be selected and the other eliminated. Alternatively, the components may be weighted (or deweighted) based on the same factors and then combined.

According to a next optional operation 1452, the pilot tone is detected.

Following the detection of the pilot tone, according to a next optional operation 1454, a residual frequency error may be determined.

According to a next optional operation, the matched filters may be adjusted based on the determined residual frequency error.

According to a next operation, the reader performs an operation based on the filtered and double converted signal.

In this description, numerous details have been set forth in order to provide a thorough understanding. In other instances, well-known features have not been described in detail in order to not obscure unnecessarily the description.

A person skilled in the art will be able to practice the embodiments in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and sub-combinations of elements, features, steps, and/or functions, which are regarded as novel and non-obvious. Additional claims for other combinations and sub-combinations may be presented in this or a related document.

What is claimed is:

1. A method for an RFID reader system, the method comprising:
   transmitting a carrier signal at a first frequency;
   receiving a backscattered tag-response signal modulated on the carrier signal which includes a first component offset above the carrier signal by approximately a subcarrier link frequency, and a second component offset below the carrier signal by approximately the subcarrier link frequency;
   frequency shifting the tag-response signal to form an intermediate signal centered at approximately zero Hz;
   frequency shifting the intermediate signal such that one of the first and second components of the tag-response signal is centered at approximately zero Hz; and
   performing an operation on at least one of the first and second components of the twice frequency-shifted signal.

2. The method of claim 1, further comprising:
   filtering one of the first and second components from one of the intermediate signal and the twice frequency-shifted signal prior to performing the operation.

3. The method of claim 1, further comprising:
   detecting at least one of a pilot tone and a preamble in the tag-response signal;
   determining a residual frequency error based on the detection; and
   employing the determined residual frequency error to initialize at least one demodulator.

4. The method of claim 1, further comprising:
   selecting one of the first and second components of the twice frequency-shifted signal on which to perform the operation based on at least one of the respective Signal-to-Noise Ratios (SNRs) and power levels of the first and second components.

5. The method of claim 1, further comprising:
   selecting one of the first and second components of the twice frequency-shifted signal on which to perform the operation based on detecting at least one of a pilot tone and a preamble in one of the first and second components.

6. The method of claim 1, further comprising:
   frequency shifting the intermediate signal such that both of the first and second components of the tag-response signal are centered at approximately zero Hz.

7. The method of claim 6, further comprising:
   weighting the first component by a first weighting factor;
   weighting the second component by a second weighting factor;
   summing the weighted components; and
   performing the operation on the weighted sum.

8. The method of claim 7, wherein the weighting factors are based on at least one of the respective Signal-to-Noise Ratios (SNRs) and power levels of the first and second components.

9. The method of claim 7, wherein the weighting factors are based on at least one of a detected pilot tone and a detected preamble in the first and second components.

10. The method of claim 1, further comprising:
    filtering the intermediate signal by using a series of decimation and finite-impulse-response filters.

11. The method of claim 10, in which
    at least one of the decimation filters is a Cascade Integrator-Comb (CIC) filter.

12. The method of claim 1, in which
    instructing the tag to provide a tag response at a subcarrier link frequency includes adjusting the subcarrier link frequency.

13. The method of claim 12, in which
    the subcarrier link frequency is adjusted based on a result of the performed operation.

14. The method of claim 1, in which
    an amount of frequency shifting to form the intermediate signal is the instructed subcarrier link frequency.

15. The method of claim 1, further comprising:
employing a bank of matched filters to filter the twice frequency-shifted signal.

16. The method of claim 15, further comprising:
detecting at least one of a pilot tone and a preamble in the twice frequency-shifted signal;
determining a residual frequency error from the detection; and
adjusting the matched filter banks based on the residual frequency error.

17. A method for an RFID reader system, the method comprising:
instructing the tag to provide a tag-response signal at a subcarrier link frequency;
instructing the tag to include a pilot tone in the tag-response signal;
transmitting a carrier signal at a first frequency;
receiving the tag-response signal which includes a first component offset above the carrier signal by approximately the subcarrier link frequency, and a second component offset below the carrier signal by approximately the subcarrier link frequency;
frequency shifting the tag-response signal to form an intermediate signal centered at approximately zero Hz;
frequency shifting the intermediate signal such that one of the first and second components of the tag-response signal is centered at approximately zero Hz;
detecting the pilot tone in the twice frequency-shifted signal; and
determining a residual frequency error from the detected pilot tone.

18. The method of claim 17, further comprising:
filtering one of the first and second components from one of the intermediate signal and the twice frequency-shifted signal prior to performing the operation.

19. The method of claim 17, further comprising:
employing the determined residual frequency error to initialize at least one demodulator.

20. The method of claim 17, further comprising:
selecting one of the first and second components of the twice frequency-shifted signal on which to perform an operation based on at least one of the respective Signal-to-Noise Ratios (SNRs) and power levels of the first and second components.

21. The method of claim 17, further comprising:
selecting one of the first and second components of the twice frequency-shifted signal on which to perform an operation based on detecting a preamble in one of the first and second components.

22. The method of claim 17, further comprising:
frequency shifting the intermediate signal such that both of the first and second components of the tag-response signal are centered at approximately zero Hz.

23. The method of claim 22, further comprising:
weighting the first component by a first weighting factor;
weighting the second component by a second weighting factor;
summing the weighted components; and
performing an operation on the weighted sum.

24. The method of claim 23, wherein the weighting factors are based on at least one of the respective Signal-to-Noise Ratios (SNRs) and power levels of the first and second components.

25. The method of claim 23, wherein the weighting factors are based on the detected pilot tone.

26. The method of claim 17, further comprising:
filtering the intermediate signal by using a series of decimation and finite-impulse-response filters.

27. The method of claim 26, in which
at least one of the decimation filters is a Cascade Integrator-Comb (CIC) filter.

28. The method of claim 17, in which
instructing the tag to provide a tag response at a subcarrier link frequency includes adjusting the subcarrier link frequency.

29. The method of claim 28, in which
the subcarrier link frequency is adjusted based on a result of a performed operation.

30. The method of claim 17, in which
an amount of frequency shifting to form the intermediate signal is the instructed subcarrier link frequency.

31. The method of claim 17, further comprising:
employing a bank of matched filters to filter the twice frequency-shifted signal.

32. The method of claim 31, further comprising:
adjusting the matched filter banks based on the residual frequency error.

33. A method for an RFID reader system, the method comprising:
instructing the tag to provide a tag-response signal at a subcarrier link frequency;
transmitting a carrier signal at a first frequency;
receiving the tag-response signal which includes a first component offset above the carrier signal by approximately the subcarrier link frequency, and a second component offset below the carrier signal by approximately the subcarrier link frequency;
frequency shifting the tag-response signal to form an intermediate signal centered at approximately zero Hz;
frequency shifting the intermediate signal such that one of the first and second components of the tag-response signal is centered at approximately zero Hz;
performing an operation on at least one of the first and second components of the twice frequency-shifted signal; and
adjusting the subcarrier link frequency based on a result of the performed operation.

34. The method of claim 33, further comprising:
filtering one of the first and second components from one of the intermediate signal and the twice frequency-shifted signal prior to performing the operation.

35. The method of claim 33, further comprising:
detecting at least one of a pilot tone and a preamble in the tag-response signal;
determining a residual frequency error based on the detection; and
employing the determined residual frequency error to initialize at least one demodulator.

36. The method of claim 33, further comprising:
selecting one of the first and second components of the twice frequency-shifted signal on which to perform the operation based on at least one of the respective Signal-to-Noise Ratios (SNRs) and power levels of the first and second components.

37. The method of claim 33, further comprising:
selecting one of the first and second components of the twice frequency-shifted signal on which to perform the operation based on detecting at least one of a pilot tone and a preamble in one of the first and second components.

38. The method of claim 33, further comprising:
frequency shifting the intermediate signal such that both of the first and second components of the tag-response signal are centered at approximately zero Hz.

39. The method of claim 38, further comprising:
weighting the first component by a first weighting factor;
weighting the second component by a second weighting factor;
summing the weighted components; and
performing the operation on the weighted sum.

40. The method of claim 39, wherein the weighting factors are based on at least one of the respective Signal-to-Noise Ratios (SNRs) and power levels of the first and second components.

41. The method of claim 38, wherein the weighting factors are based on at least one of a detected pilot tone and a detected preamble in the first and second components.

42. The method of claim 33, further comprising:
filtering the intermediate signal by using a series of decimation and finite-impulse-response filters.

43. The method of claim 42, in which
at least one of the decimation filters is a Cascade Integrator-Comb (CIC) filter.

44. The method of claim 33, in which
instructing the tag to provide a tag response at a subcarrier link frequency includes adjusting the subcarrier link frequency.

45. The method of claim 44, further comprising
reinstructing the tag to provide another tag response signal at the adjusted subcarrier link frequency.

46. The method of claim 33, in which
an amount of frequency shifting to form the intermediate signal is the instructed subcarrier link frequency.

47. The method of claim 33, further comprising:
employing a bank of matched filters to filter the twice frequency-shifted signal.

48. The method of claim 47, further comprising:
detecting at least one of a pilot tone and a preamble in the twice frequency-shifted signal;
determining a residual frequency error from the detection; and
adjusting the matched filter banks based on the residual frequency error.

* * * * *